United States Patent [19]

Tamura et al.

[11] 4,400,071
[45] Aug. 23, 1983

[54] AUTO-FOCUS CAMERA

[75] Inventors: Shuichi Tamura, Yokohama; Toyotosi Suzuki; Hideo Tamamura, both of Tokyo; Mutsuhide Matsuda, Yokohama, all of Japan

[73] Assignee: Canon Kabushiki Kaisha, Tokyo, Japan

[21] Appl. No.: 374,530

[22] Filed: May 3, 1982

Related U.S. Application Data

[63] Continuation of Ser. No. 193,459, Oct. 3, 1980, abandoned.

[30] Foreign Application Priority Data

Oct. 8, 1979 [JP] Japan .................................. 54-129653

[51] Int. Cl.³ ...................... G03B 13/08; G03B 13/20
[52] U.S. Cl. ......................................... 354/25; 356/8
[58] Field of Search .................... 354/25 R, 25 A, 53, 354/57, 60 E, 163–166, 168, 169, 195, 198–201, 212, 54, 55, 219, 224, 225; 352/139, 140, 170, 171; 356/8

[56] References Cited

U.S. PATENT DOCUMENTS

| 3,442,193 | 5/1969 | Pagel | 354/25 A |
| 3,820,129 | 6/1974 | Hosoe et al. | 354/25 A |
| 4,142,788 | 3/1979 | Matsumoto et al. | 354/198 X |
| 4,221,475 | 9/1980 | Tamura | 354/25 |

FOREIGN PATENT DOCUMENTS 54-106225  8/1979  Japan ..................................... 354/25

Primary Examiner—William B. Perkey
Attorney, Agent, or Firm—Toren, McGeady and Stanger

[57] ABSTRACT

In a mark finder for an auto-focus camera provided with a photographic field mark indicating a picture frame within the field of view of the finder, and a distance measuring area mark indicating the light metering field of a photo-electric in-focus detecting device, the above-described phototgraphic field mark and the above-described distance measuring area mark are formed to be adjustable independently of each other.

6 Claims, 5 Drawing Figures

AUTO-FOCUS CAMERA

This is a continuation of application Ser. No. 193,459, filed Oct. 3, 1980, now abandoned.

BACKGROUND OF THE INVENTION

This invention relates to auto-focus cameras with photo-electric focus degree measuring means.

It is known to provide a wide variety of types of photo-electric focus degree measuring means in such camera. Of these, the photo-electric focus coincidence detecting mechanism employing the so-called "principle of triangulation" has an important requirement that the two optical system be adjusted in respect to optical axis, as their relative position error leads to a loss in the ability of distance measurement. Moreover, its adjusting mechanism necessitates a fine adjustment so that it tends to be complicated in structure and its adjusting work is very troublesome.

In other words, the conventional triangulation type distance measuring mechanism has the photographic view frame indicating the lens field and the distance measuring area mark indicating the distance measuring field as formed in unison. Thus, there is need of collimating the above-described two optical system in isolation from each other. More concretely speaking, the artisan used first to arrange the photographic field frame within the interior of the finder at an adjusted position with reference to the optical axis of the taking lens, and then to adjust the position of each of the above-described two optical systems, (for example, light projecting optical system and light sensing optical system) with reference to the distance measuring field mark formed in unison with the above-described photographic field frame. However, since, for example, the light projection optical system generally includes means for scanning the light beam, the additional use of the adjusting mechanism for the adjustment of this light projecting optical system calls for difficulties in manufacturing, assembling and adjustment, that is, all the phases of production giving very large disadvantages from the economical and technical standpoints.

SUMMARY OF THE INVENTION

An object of the present invention is to provide an auto-focus camera with a photo-electric focus coincidence detecting mechanism based on the triangulation principle of which the assembling and adjustment can be simplified.

Another object of the present invention is to provide an auto-focus camera of simple structure while nevertheless preserving high precise tolerances.

According to an embodiment of the present invention, in the active type photo-electric focus coincidence detecting mechanism comprising a radiation energy projecting source (for example, infrared light emitting diode and projection lens) and a radiation energy receptor (for example, silicon photo-cell and condenser lens) positioned in spaced relation by a predetermined distance, the arrangement is made such that the angle of projection of the above-described radiation energy source varies as a member for charging a lens drive spring displaces, whereby the complexity of structure of the mechanism can be minimized.

DESCRIPTION OF THE PREFERRED EMBODIMENT

The present invention will next be described in greater detail in connection with an embodiment thereof.

Referring to FIGS. 1 to 4, a pair of optical systems are disposed in separation by a predetermined base length, one of which projects a radiation energy such as infrared light as is sweepingly moved, while the reflected light from an object to be photographed is received through the other optical system by a light sensitive element, thus constituting part of a so-called active type focus coincidence detection device built-in camera.

Figure 1:
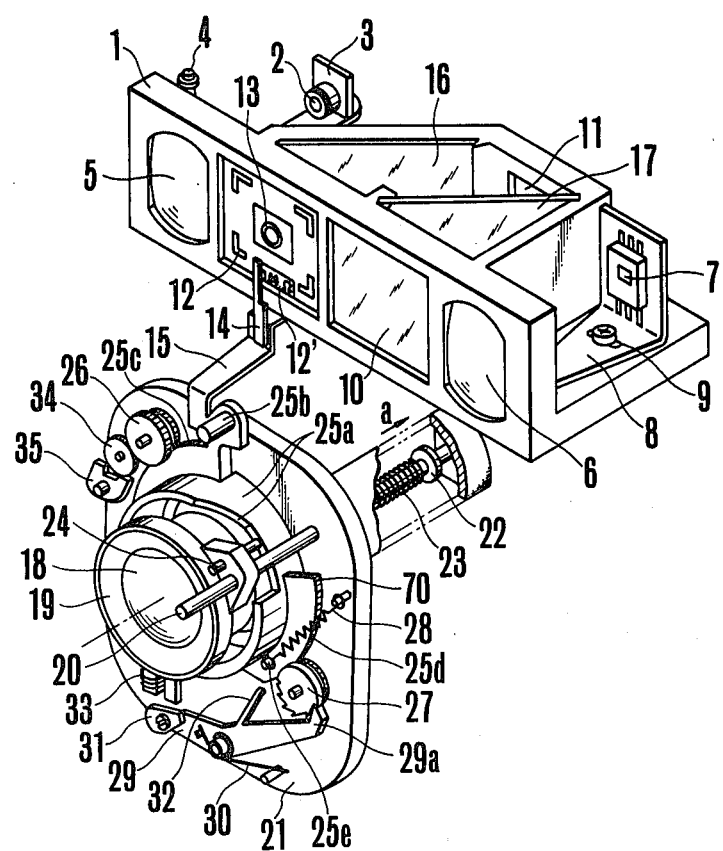
FIG. 1 is a perspective view of the main parts of a focus adjusting mechanism according to the present invention.

In FIG. 1, a finder framework 1 carries a distance measuring mechanism and a finder optical system in unison. A light source 2 such as an infrared light emitting diode is held in a lever 3 which is pivotally mounted at a pin 4. Light from the light-emitting element 2 is projected by a first distance measuring lens 5 in a beam. A second distance measuring lens 6 focuses the reflected light from the object at or near a light sensitive element 7 which is supported on a lever 8 fixed to the finder framework 1 by a screw fastener 9. The slot in the light sensor element carrying lever 8 which the fastener screw 9 penetrates is arcuately elongated about an pivot pin 1a so that said lever 8 can change its angular position.

10 is a finder objective lens; 11 is a finder eye-piece; 12 is photographic field frame corners (mask) indicating a lens field within the interior of the finder. Below the field of view of the finder there is shown a zone mark portion 12' roughly representing all the object distances.

The above-described field mask 12 is provided with a cutout at the central area thereof into which a distance measuring area mark 13 as a separate member can be attached. 14 is an index cooperating with the distance zone scale 12' and fixedly mounted on a lever 15 which is operatively connected to a focus adjusting mechanism to be described more fully later. 16 is a total reflection mirror reflecting light from the photographic field mask 12 and distance measuring area mark 13 to a semi-transparent mirror 17 for superimposing the field frame corners 12 and mark 13 on an image of the object formed with light entering through the objective lens 10 in the finder.

18 is a photo-taking lens; 19 is a lens barrel; 20 is a guide shaft fixedly carrying the lens barrel 19 and axially slidably fitted in a camera housing 21. A spring 23 is provided between the housing 21 and a lock washer 22 provided on the guide shaft 20 at a suitable location, urging the lens barrel 19 to move in a direction indicated by arrow, a, or toward the camera housing.

24 is a distance adjusting pin having a threaded portion for adjustment of the position of the photo-taking lens relative to the film plane and caused to abut at its end against a cam portion 25a of the distance adjusting member 25, and the threaded portion engages the lens barrel 19. It is noted that the distance adjusting member 25 is further provided with an extension 25b arranged to engage with the above-described connection lever 15, a geared portion 25c meshing with a speed up gear 26 in a governer, a second geared portion 25d meshing with a stop pawl wheel 27, and a pin 25e to which one end of a drive spring 28 is connected, and is rotatably fitted on the camera housing 21.

29 is a stop lever normally urged in a counterclockwise direction as viewed in the figure by a spring 30 and its one end 29a is engageable with one of the teeth of the stop pawl wheel 27. At the opposite end of said stop lever 29 is rotatably supported a magnet armature 31. Further at a portion of the lever 29 there is fixed a resilient member 32 extending into the path of movement of a cam portion (not shown) of the distance adjusting ring so that when winding up the film, the lever 29 is turned in a clockwise direction until the armature 31 contacts with a yoke 33.

34 is an escape wheel meshing with the speed up gear 26 and cooperating with anchor 35 to control the speed of rotation of the distance adjusting member 25 driven by the spring 28.

Figure 2:
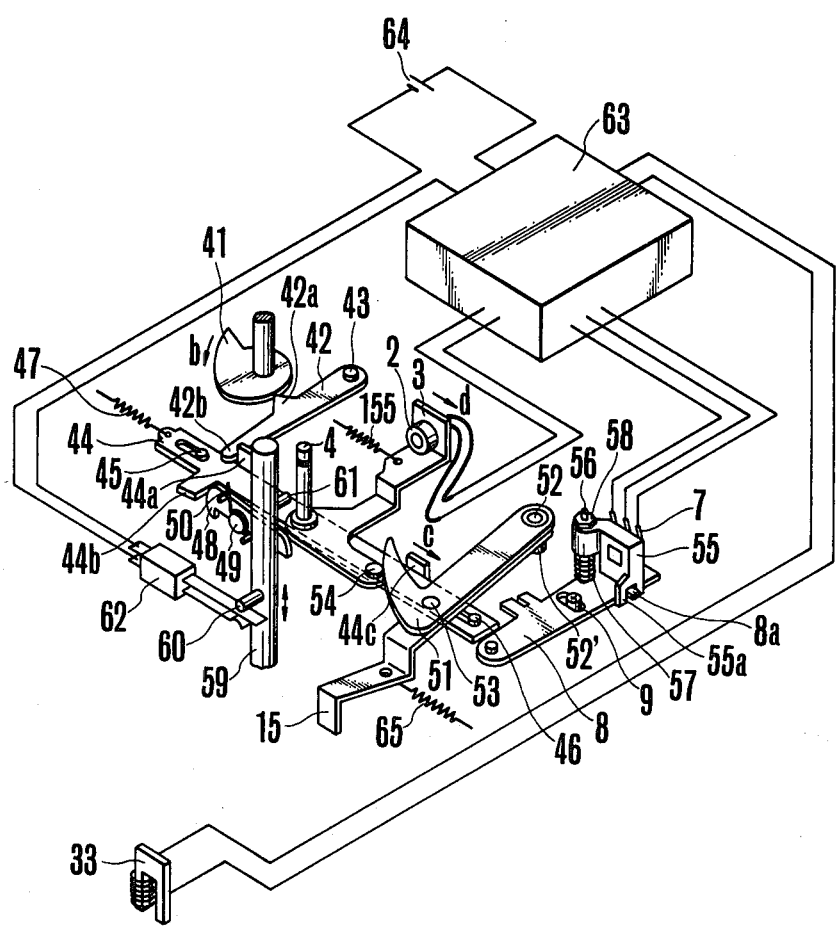
FIG. 2 is a perspective view of the main parts of the distance measuring mechanism according to the present invention.

FIG. 2 shows a distance measuring mechanism. 41 is a charge cam rotatably mounted in the camera housing and arranged to rotate one revolution each time one cycle of winding operation is performed by a film advancing mechanism (not shown). 42 is a lever having a protuberance 42a for abutment on the above-described charge cam 41 and pivotally mounted on a shaft 43 fixed in the housing. The free end of the lever 42 engages with a standing up portion 44 of a charge slide 44. The slide 44 is guided by pins 45 and 46 fixedly mounted on the camera housing, biased by a spring 47 to move to the left as viewed in the figure, and has three projected portions 44a, 44b and 44c. A charge latching member 48 is pivotally mounted at a pin 49, and is biased by a spring 50 to turn in a counterclockwise direction. A distance meter cam 51 is caulked to a metal 52 in coaxially rotatable relation to an intercommunication lever 15. After the relative positions of the parts 51 and 15 to each other has been adjusted, they are fixed to each other by a screw fastener 53 so that they turn in unison about a pivot pin 52' on which the metal 52 is fitted. 54 is a pin planted on the light-emitting diode lever 3 and normally abutting on the distance meter cam 51 as a spring 155 urges the diode lever 3 to turn about the pin 4 in the counterclockwise direction as viewed in FIG. 2. 55 is a light sensitive element holder fixedly carrying the light sensitive element 7, and mounted on the light sensitive element lever 8 through a shaft 56 of which the upper part is screw-threaded. A helical spring 57 surrounding the shaft 56 urges the holder 55 to abut against a nut 58. A forked portion 55a slidably engages with a projection 8a of the light sensitive element lever 8 so that the light sensitive element holder 55 is restrained from rotation about the shaft 56.

59 is a shutter rod having planted thereon a pin 60 for actuating a main switch 62 and a pin 61 for actuating the latching lever 48 as is guided by a member (not shown) and is biased upward as viewed in FIG. 2. 63 is a control circuit of a photo-electric focus coincidence detecting device which functions to drive the light-emitting diode 2, amplify the signal from the photo-sensitive element 7, detect when the image is in focus, and control the actuation of the magnet.

Next explanation is given to the operation of this embodiment by reference to FIGS. 1 and 2.

The operator will first cock a film winding lever (not shown), thereby the charge cam 41 is turned in a direction indicated by arrow, b. As the cam lift is increasing, the charge lever 42 is turned in the counterclockwise direction as viewed in the figures, while the end portion 42b is brought into engagement with the standing portion 44a of the charge slide and then drives the said charge slide 44 to move in a direction indicated by arrow, c, against the force of the spring 47. Thus, charge slide 44 engages at its standing portion 44c with the interconnection lever 15. At this time, though the interconnection lever 15 is biased by the spring 65 in an escaping direction, because of the engagement of its end portion with the projection 25b of the distance adjusting member 25 of FIG. 1, the stronger spring 28 urges the interconnection lever 15 in the clockwise direction. Therefore, such rightward movement of the slide 44 causes counterclockwise movement of the interconnection lever 15 by the standing-up portion 44c abuttingly engaging therewith, which in turn causes clockwise movement of the distance adjusting member 25 as viewed in FIG. 1. At or near the terminal end of movement of the slide 44, the sideward extension 44b is cathoed by the latching lever 48 so that even when the lift of the charge cam 41 returns to the start position, the charge slide 44 is left unchanged from the latched position.

Then, when to initiate an exposure, the shutter rod 59 is pushed down to a first stroke at which the pin 60 turns on the main switch 62, thereby the photo-electric focus coincidence detecting circuit 63, and therefrom to a second stroke at which the pin 61 turns the latching lever 48 in the clockwise direction against the spring 50, thereby the charge slide 44 is released from the latching connection. Then, the charge slide 44 moves to the opposite direction to that indicated at c, returning to the start position, while permitting the distance adjusting member 25 to turn in the counterclockwise direction under the action of spring 28, as the interconnection lever 15 is made in mere contact with the projection 25b of the distance adjusting member 25 by the weak spring 65.

It is noted that prior to this, the distance adjusting member 25 sets the stop lever 29 in a position where the armature 31 lies in intimate contact with the yoke 33 by its projected portion (not shown) depressing the resilient arm 32 of the stop lever 29, and then when the main switch 62 is closed, the auto-focus detecting circuit 63 actuates the magnet 33 to be energized as has been mentioned above, thus the stop lever 29 is prevented from moving from the attracted position against the bias force of the spring 30 even when the resilient arm 32 is taken out of the depression.

It is further noted that since the geared portion 25c of the distance adjusting member 25 meshes with the speed up gear 26 constituting part of the constant speed mechanism, the distance adjusting member 25 rotates at a predetermined speed.

As the distance adjusting member 25 rotates, the interconnection lever 15 turns in the reversed direction to that indicated by arrow, c against the spring 65, and the distance meter cam 51 affixed thereto also turns in pushing engagement at the pin 54 on the diode lever 3, causing the diode lever 3 to turn in the direction, d, against the spring 155, while the output of the light-emitting element 2 after having been collimated by the projection lens 5 is scanning the object space.

Further since the distance adjusting pin 24 is caused by the bias force of the spring 23 to abut on the cam portion 25a of the distance adjusting member 25, as the distance adjusting member turns in the counterclockwise direction, the photo-taking lens 18 moves in a direction indicated by arrow, a. Assuming that the object lies at an intermediate point of position in the focusing range, then when the intersection of the two optical paths of the light projector and sensor coincides with the object point, the reflected light from the object enters the light sensitive element 7 with the production of a peak output therefrom as detected by the detecting circuit 63. It is at this time that the current supply to the magnet 33 is cut off. Such de-energization causes the armature 31 to move away from the yoke 33 and permits the stop lever 29 to turn in the counterclockwise direction until its pawl 29a engages with one of the teeth of the stop wheel 27. Thus, the distance adjusting member 25 is arrested.

This results in the photo-taking lens 18 focused to the given object distance, and the interconnection lever 15 takes the corresponding position in which the index 14 on said interconnection lever is placed in registry with the corresponding one of the zone marks just below the finder view frame. Looking through the finder, the operator is able to roughly estimate the object distance. Suppose the object lies at a long distance beyond the focusing range, as the peak level is lowered in proportion to the square of the distance, no output signal is produced from the detecting circuit 63 until the amount of rotation of the distance adjusting member 25 reaches a nearly maximum level, at which the magnetic winding 33 is de-energized. Then, the distance adjusting member 25 gets stopped at the terminal end of movement thereof by the stop lever 29.

Figure 3:
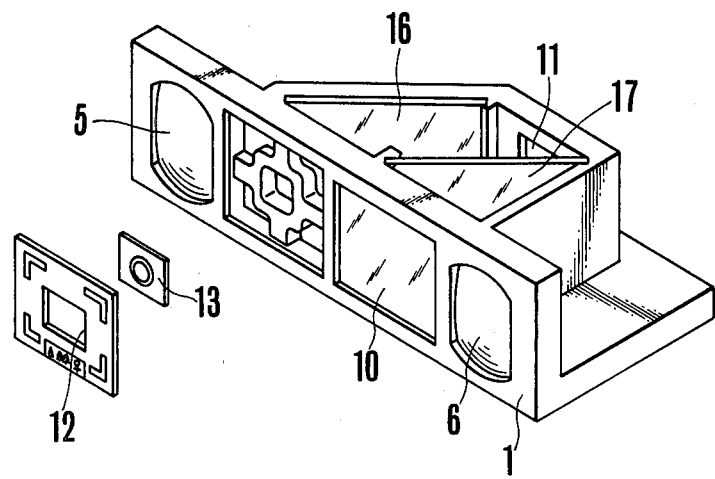
FIG. 3 is an exploded perspective view of the finder according to the present invention.
Figure 4:
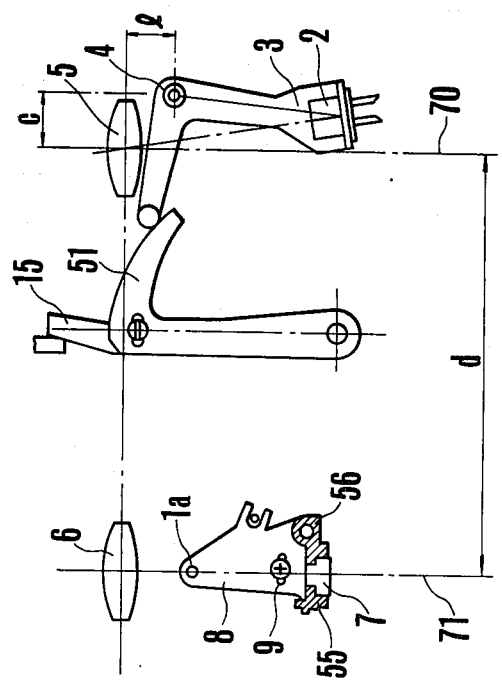
FIG. 4 is an elevational view of the main parts of the distance measuring mechanism of FIG. 2.

Next explanation is given to an adjustment process essential to the present invention. With reference to FIGS. 3 and 4 showing the outline of an adjusting mechanism as well as FIGS. 1 and 2, after all the parts except the photographic field mask 12 and the distance measuring field mark 13 have been assembled in the finder framework 1, the artisan has first to set the interconnection lever 15 at a point of position corresponding to a prescribed object distance and then to light-up the light source 2. At this time, because of the lack of uniformity of the diode lever and the like parts, the light is projected at a position deviated from the ideal one on the design by some amount. In this state, the reflection plate is put at the above-described prescribed distance away therefrom. Then, looking through the eye-piece 11 of the finder, the artisan has to adjust the position of the distance measuring area mark 13 with reference to an image of the light source on the reflection plate and then to fix said mark 13 in the adjusted position by the use of an adhesive or the like. On the other hand, the position of the light sensitive element 7 is made adjusted in horizontal directions by turning the light sensitive element lever 8 about the axis 1a and in vertical directions by turning the nut 58 about the axis of the shaft 56 as is screw-threaded. After that, as has been mentioned above, the finder unit is attached to the camera body and then the frame mask 12 is assembled with the finder body 1 with reference to the optical axis of the photo-taking lens.

As a result of the foregoing adjustment procedure, the distance measuring area takes a position as is deviated from the center of the area of the picture frame. But since the rangefinder and the viewfinder are inherently of parallax, the magnitude of that deviation is small as compared with the size of the field mask, and therefore may be neglected in the actual practice. Again, when in adjusting the horizontal position of the light sensitive element by turning it about the axis 1a, there is some possibility of occurrence of an inclination of the element with the optical axis, a focus error of the element surface and the like. This problem also can be actually sufficiently eliminated provided that the distance between the pivot axis and the light sensitive element is taken at an appropriate value. It is essential for the base length type distance meter as in this embodiment that the relative position of the two optical systems can be finely adjusted.

With such consideration in mind, the present invention is to provide an effective means for realizing the photo-electric focus coincidence detection and focus adjustment, while still being made of simple structure. Though this embodiment because of its employing the moving light source has been described as the adjusting operation is carried out with the light sensor system, it is of course possible to make use of the light source in the adjustment purpose while the light sensor system being fixed in position. The principles of the invention are applicable to the so-called passive type photo-electric focus coincidence detecting device. But no description of it by reference to the drawings is given.

In the following, by reference to FIGS. 4 and 5, the present invention will be described in greater detail in connection with the base length type distance meter of which one of the two optical paths is a light projection optical path of infrared light onto the object, and the other is a receiving optical path of the reflected path of the projection light from the object.

Figure 5:
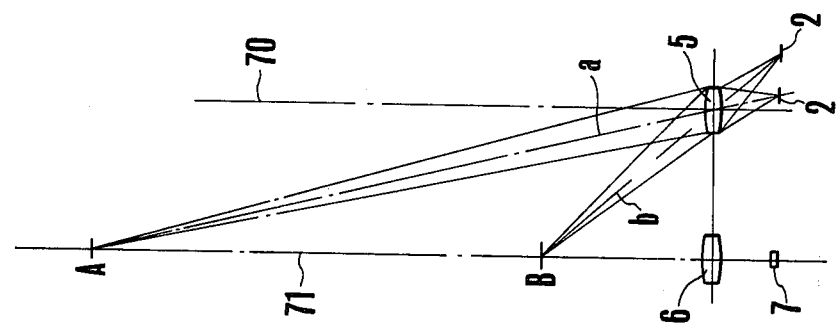
FIG. 5 is a graphic representation of the principle of the distance measuring optical system of the invention.

As shown in FIG. 5, in order to sharp the projection light image on the object, it is required that, for example, when the object lies at a long distance, the light source 2 is near the projection optical axis (at "a" position illustrated) as scans the object, and when the object distance is shorter, the light source 2 is moved away from the projection optical axis (to "b" position illustrated) as scans on the object.

FIG. 4 is a schematic view locking from the top of the camera of an example of a practical distance measuring mechanism satisfying the requirement described in connection with FIG. 5. Its characteristic feature resides in that the pivot pin 4 planted on the diode lever 3 exists as is off-set from the projection optical axis 70 to the opposite side to that in which the light receiving optical axis 71.

This gives rise to advantages that since a sharp projection image can be formed on the object to be measured for the distance, the accuracy of distance measurement is increased, and that since the pivot pin 4 may be positioned in the same plane of the projection light sweep at such location that the projection light is not blocked, the distance measuring mechanism can be made very compact.

In FIG. 4, it is assumed that on the light receiving optical axis 71 there is arranged the light sensitive element 7 at a point almost coincident with the focal plane of the condenser lens 6, and the prescribed projection optical axis 70 is spaced from the light receiving optical axis by a distance, d. The light projection optical system 5 is assumed to have an optical axis in coincidence with the light projection optical axis 70. Since the diode lever 3 as the rotary member is pivoted at the pin 4 disposed toward the opposite side to that in which the light receiving optical axis 71 lies from the prescribed light projection optical axis 70 by a distance, c, the projection image formed by the projection lens 5 with the light from the infrared light emitting diode on one end of the diode lever 3 is always almost sharp when scanning the object.

Therefore, the projection image on the object to be focused by the light receiving lens 6 can assure a high focusing accuracy on the light sensitive element. It is noted that the other end of the diode lever 3 is operatively connected through the end portion 15 of the interconnection lever 51 to the photo-taking lens focusing control mechanism.

According to this embodiment, it is made possible with very ease to scan the sharp projection image on the object.

Further, in the auto-focus device as in this embodiment, if the light receiving optical axis does not lie in the plane in which the light source scans, there is a high possibility of producing a loss in the signal and the like. Particularly when the projection light source is used in scanning, its pivot metal must be as long in the fitted portion as possible so that there is no looseness and inclination. In this embodiment, the positioning of the pivot metal of the diode lever 3 away from the light projection optical path, or as spaced from the lens 5 by a distance, l, enables a pivot metal of long fitness to be realized in compact form.

As in the above, according to the present invention, the finder photograph field mark and the finder distance measuring field mark are made separated independently of each other and they can be adjusted in position independently of each other, thereby the work time necessary to assemble and adjust the camera is remarkably shortened, contributing to a large decrease in the cost of the camera. Also from the standpoint of photographic techniques such as that in which as the subject of principal photographic interest does not lie at the center of the picture frame, the operator first aligns the camera to the subject to measure the distance followed by the focusing of the photo-taking lens, and then recomposes a desired photographic field, the adjusting method of the invention is very advantageous in achieving such adjustment of the focus with high accuracy.

What is claimed is:

1. An auto-focus camera comprising:
   a photo-taking lens;
   focusing means arranged to move said photo-taking lens for focusing;
   a first distance measuring optical path including a light emitting element, said optical path being arranged to scan an object to be photographed with a light beam in response to the operation of said focusing means;
   a second distance measuring optical path including a light receiving element, said second distance measuring optical path being arranged to receive a reflection light of said light beam from said object;
   a viewfinder optical system;
   a photo-taking visual field mask disposed within said viewfinder optical system, said mask having a mark indicating a photographing range in its circumferential portion, and an opening at its central portion, and being fixed to the finder framework with positional adjustment with respect to the photographic optical axis; and
   a distance measuring visual field mask separated from said photo-taking visual mask and disposed within the viewfinder optical system, said mask having a mark indicating a distance measuring visual field, and being adjustable in position independently from said photo-taking visual mask.

2. An auto-focus camera according to claim 1, wherein said first optical path performs a scanning operation on said object with said light beam by shifting the position of said light emitting element in response to the operation of said focusing means.

3. An auto-focus camera according to claim 1, further comprising a pointer which is arranged to move in response to the operation of said focusing means and a distance indication mark arrangement disposed within said viewfinder optical system, said pointer and said mark arrangement being arranged to display within the viewfinder a photo-taking distance set by the focusing means.

4. An auto-focus camera according to claim 1, wherein an optical system which forms said first distance measuring optical path and another optical system which forms said second distance measuring optical path are disposed respectively on the framework of the viewfinder with said viewfinder optical system interposed in-between them.

5. An auto-focus camera comprising:
   a photo-taking lens;
   focusing means arranged to move said photo-taking lens for focusing;
   a first distance measuring optical path including a first lens and a light emitting element, said optical path being arranged to perform a scanning operation on an object to be photographed in response to the operation of said focusing means;
   a second distance measuring optical path including a second lens and a light receiving element, said light receiving element being fixedly arranged after said second lens;
   means for holding said light receiving element, said holding means being adjustable in correspondence to the positional relation in horizontal and vertical directions of the light receiving element with the first distance optical path and the focusing means;
   a viewfinder optical system;
   a photo-taking visual field mask disposed within the viewfinder optical system; and
   a distance measuring visual field mask disposed within the viewfinder optical system separately from the photo-taking visual field mask, said distance measuring visual field mask being adjustable in a position with respect to the second distance measuring optical path independently from the photo-taking visual field mask.

6. An auto-focus camera comprising:
   a photo-taking lens;
   focusing means arranged to move said photo-taking lens for focusing;
   a first distance measuring optical path including a first lens and a first distance measuring element, said optical path being arranged to perform a scanning operation on an object to be photographed in response to the operation of said focusing means;

a second distance measuring optical path including a second lens and a second distance measuring element, said second distance measuring element being fixedly arranged behind the second lens;

means for holding the second distance measuring element, said means being able to adjust the position of the second distance measuring element;

a viewfinder optical system;

a photo-taking visual field mask disposed within the viewfinder optical system, said mask having a mark indicating a photographing range in its circumferential portion, and an opening at its central portion, and being fixed to the finder framework with positional adjustment with respect to the photographic optical axis; and a distance measuring visual field mask separated from said photo-taking visual mask and disposed within the viewfinder optical system, said mask having a mark indicating a distance measuring visual field and being adjustable in position independently from said photo-taking visual mask.

* * * * *